(12) United States Patent
Kwok et al.

(10) Patent No.: US 7,536,259 B2
(45) Date of Patent: May 19, 2009

(54) NAVIGATION SYSTEM

(75) Inventors: Wing Fai Kwok, Zama (JP); Manabu Sera, Chigasaki (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 488 days.

(21) Appl. No.: 11/378,548

(22) Filed: Mar. 18, 2006

(65) Prior Publication Data
US 2006/0224302 A1  Oct. 5, 2006

(30) Foreign Application Priority Data
Mar. 30, 2005 (JP) ............................. 2005-097317
Nov. 11, 2005 (JP) ............................. 2005-327042

(51) Int. Cl.
*G01C 21/00* (2006.01)

(52) U.S. Cl. .................. 701/210; 701/211; 340/995.13; 340/995.19

(58) Field of Classification Search ....................... None
See application file for complete search history.

(56) References Cited

U.S. PATENT DOCUMENTS 5,892,463 A * 4/1999 Hikita et al. ........... 340/995.13
5,911,773 A * 6/1999 Mutsuga et al. ............. 701/200
2004/0143387 A1* 7/2004 Shimizu et al. ............. 701/209
2005/0071081 A1* 3/2005 Hirose et al. ................ 701/210
2005/0234640 A1* 10/2005 Hiyokawa et al. ........... 701/210

FOREIGN PATENT DOCUMENTS

JP   2001-349735 A    6/2000
JP   2001-227965    *  8/2001

* cited by examiner

*Primary Examiner*—Michael J. Zanelli
(74) *Attorney, Agent, or Firm*—Young Basile (57) ABSTRACT

A navigation system comprising an apparatus and method for navigating a vehicle along a detour route when appropriate. A destination is set, and the current location, or site, is detected. Guiding is performed along an optimum route from the current location to the destination. When a traffic obstacle that requires a detour from the optimum route is detected, a detour to the destination that detours the traffic obstacle is searched. The detour is a route having the shortest time and/or the shortest distance from the current location to the destination. Guiding is performed for the detour route at a site located a prescribed distance from a branching point where branching is to be made from the optimum route to one of at least two detour routes.

16 Claims, 5 Drawing Sheets

NAVIGATION SYSTEM

FIELD OF THE INVENTION

The present invention pertains to a navigation system, particularly to a type of route guiding device and a route guiding method for navigating a vehicle along a route to a destination.

BACKGROUND OF THE INVENTION

Known navigation devices perform routing functions. For example, Japanese Kokai Patent Application No. 2001-349735 teaches a navigation device wherein when a traffic restriction or traffic jam or the like arises on the route to a destination, the device guides a vehicle to a detour route at a predetermined distance or time from the site where the traffic restriction or traffic jam has arisen.

In the conventional navigation device, however, problems can arise because the driver may not be able to enter the optimal detour route because if the predetermined distance or time is short, guidance to a detour route can be provided after passing the branching point to the detour route.

SUMMARY OF THE INVENTION

Accordingly, the invention makes it possible to prompt the driver to make an appropriate judgment as to whether to advance to the detour route. Detour route guidance can be provided at the optimal location.

More specifically, the navigation system provides an apparatus for navigating a vehicle comprising an input device operable to set a destination, a location detector operable to detect a current location of the vehicle, at least one receiver operable to acquire traffic information, including an existence of a traffic obstacle on an optimum route from the current location to the destination, and a controller. The controller is operable to search for a detour having the shortest time to the destination and/or the shortest distance to the destination in order to detour around the traffic obstacle when the existence of the traffic obstacle is detected. The controller is also operable to perform guidance related to the detour a prescribed distance before a branching point that branches from the optimum route to the detour.

The navigation system also provides an apparatus for navigating a vehicle comprising destination setting means for setting a destination, current location detection means for detecting a current location of the vehicle, traffic information acquisition means for acquiring traffic information, and route search means for searching for an optimum route from the current location to the destination. The apparatus also includes detour search means for searching for a detour having a shortest time and/or a shortest distance to the destination to detour around a traffic obstacle when the traffic obstacle is detected on the optimum route and detour guidance means for performing guidance at a prescribed distance before a branching point that branches from the optimum route to the detour.

Another embodiment of the navigation system is a method for navigating a vehicle comprising setting a destination, detecting a current location of the vehicle, acquiring traffic information, and searching for an optimum route from the current location to the destination. The method also includes searching for a detour having a shortest time and/or a shortest distance to the destination to detour around a traffic obstacle when the traffic obstacle is detected based on the acquired traffic information and performing guidance at a prescribed distance before a branching point that branches from the optimum route to the detour.

Other inventive features of the apparatus and method are described in further detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
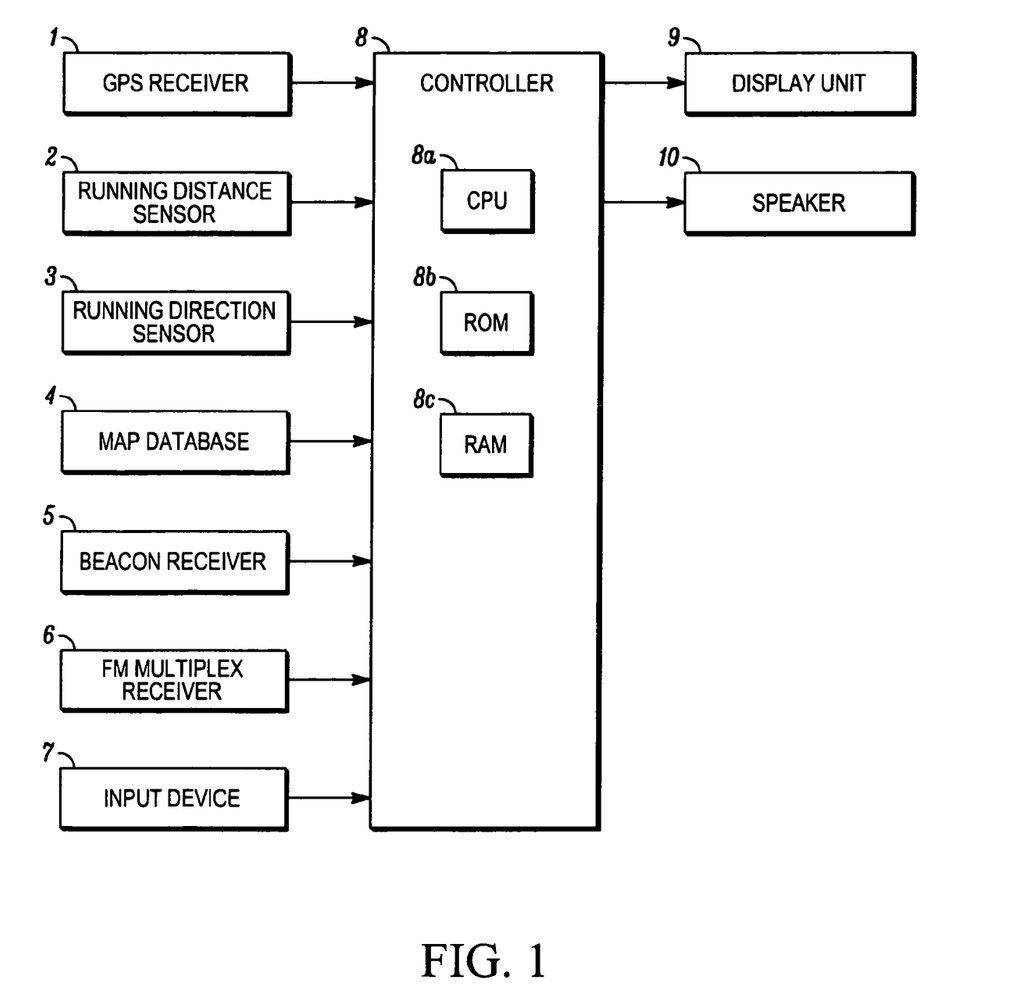
FIG. 1 is a block diagram illustrating an apparatus according to an embodiment.

FIG. 1 is a block diagram illustrating an apparatus in one embodiment. A global positioning system (GPS) receiver 1 receives electromagnetic waves from a satellite and detects the vehicle using the satellite navigation method. A running distance sensor 2 detects the running distance of the vehicle, and a running direction sensor 3 detects the running direction of the vehicle. Together GPS receiver 1, running distance sensor 2 and running direction sensor 3 perform the function of detecting the current site of the vehicle. The current site of the vehicle is detected using the self-governing navigation method based on the running distance and running direction detected with the sensors 2, 3. A map database 4 works as a storage device for storing a road map.

A beacon receiver 5 receives beacon broadcasting signals emitted from optical beacon transmitters and electromagnetic wave beacon transmitters set by the road, and a FM multiplex receiver 6 receives FM multiplex broadcasting signals emitted from an FM broadcasting station. These beacon broadcasting signals and FM multiplex broadcasting signals contain all road traffic information, including traffic hazards that have arisen on roads due to a traffic restriction or traffic jam, projects, accidents, weather conditions, etc. Hence, the beacon receiver 5 and FM multiplex receiver 6 perform the function of acquiring traffic information.

In this embodiment, an input device 7 performs the function of setting a destination for the vehicle. More specifically, the input device 7 has switches, direction keys, and other manipulating members, and it changes the scale and scrolls a road map displayed on a display unit 9, sets the destination, etc. A controller 8 has CPU 8a, ROM 8b, RAM 8c, etc., and it displays on display unit 9 the road map around the current site and the route between the current site and the destination. At the same time, the controller 8 performs guiding announcements with a speaker 10 for searching of a route and guiding of the route. The controller 8 thus performs the functions of searching for a route and detecting traffic hazards as discussed in more detail hereinafter. Together, the controller 8, display unit 9 and speaker 10 perform the functions of guiding the vehicle along one or more routes.

Figure 2:
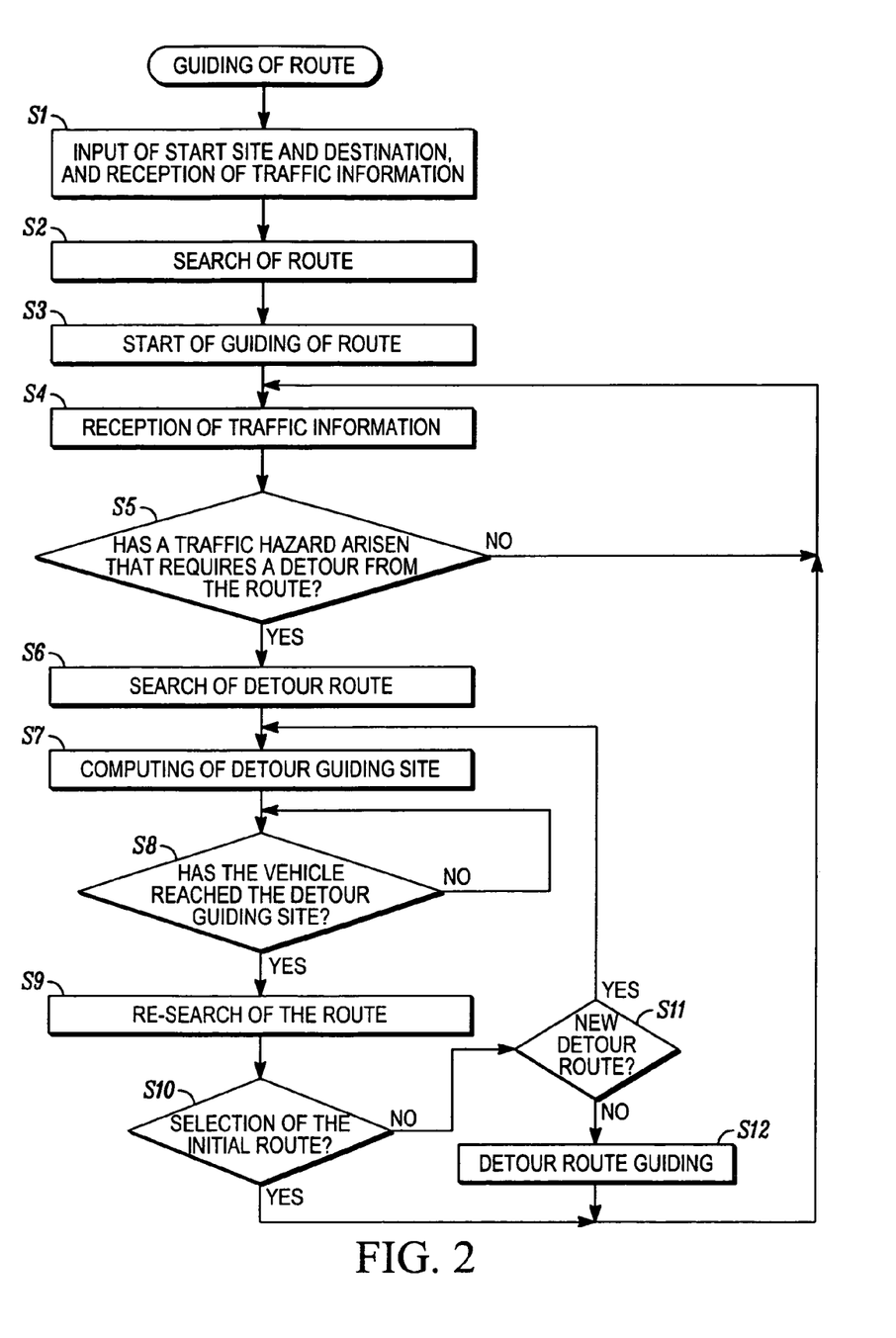
FIG. 2 is a flow chart illustrating the route guiding program in a first embodiment.

FIG. 2 is a flow chart illustrating the route guiding program in an embodiment of the present invention. In the following, an explanation will be given regarding the operation of an embodiment with reference to this flow chart. Under controller 8, after the power is turned ON for the navigation device, the route guiding program is executed repeatedly.

In step S1, input device 7 is used to input the start site, destination and sites on the way. At the same time, the road traffic information is received with beacon receiver 5 and FM multiplex receiver 6. In step S2, using the well-known Dykstra method, a computation is performed for the shortest time in consideration of the newest road traffic information, and the optimum route to the destination (the shortest-time route) is searched. In step S3, the road map around the current site is displayed on display unit 9, the shortest-time route from the current site to the destination of the vehicle is displayed on the road map, and guiding for the route is started. One may also adopt a scheme in which by means of the Dykstra method, computation of the shortest distance is performed, and the shortest-distance route to the destination is searched.

In step S4, road traffic information is received with beacon receiver 5 and FM multiplex receiver 6. Then, in step S5, the received road traffic information is analyzed. Generation of traffic hazards, such as a traffic restriction or traffic jam, on the optimum route to the destination, that is, generation of a traffic hazard that requires a detour from the initial optimum route, is checked. Here, a traffic hazard refers to all traffic problems, such as a traffic jam, traffic restriction, road work, accidents, weather, etc., that can arise on roads. When no traffic hazard that requires a detour from the initial optimum route has arisen, the process returns to step S4. Then, while guiding of the route is continued along the optimum route to the destination, traffic information is received, and generation of a traffic hazard that requires a detour is checked.

On the other hand, when a traffic hazard that requires a detour from the optimum route has arisen, the process goes to step S6, and computation of the shortest time is performed using the Dykstra method. Searching is performed for a detour route to the destination with the detour occurring at the site where the traffic hazard requiring a detour has arisen.

Figure 3:
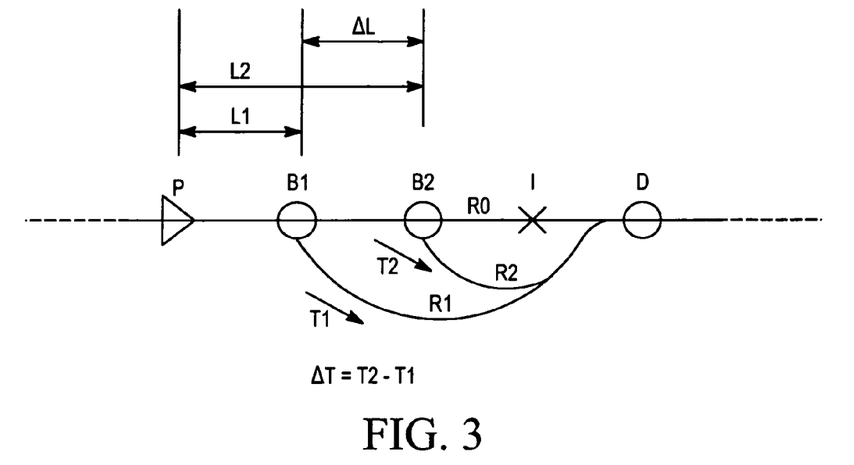
FIG. 3 is a diagram illustrating the selection method of the detour route.

Here, the method for searching a detour route in an embodiment of the present invention will be explained. In this embodiment, two types of detour routes are searched, and one of them is selected. As shown in FIG. 3, two routes are selected from among plural candidate detour routes to destination D by detouring site I where a traffic hazard has arisen by branching from a branching site located between current site P and site I where the traffic hazard requiring a detour has arisen. First, the detour route with the shortest required time is designated optimum detour route R1, and the branching site where branching is performed from initial optimum detour route R0 to optimum detour route R1 is designated optimum branching site B1. Second, the last detour route prior to site I where a traffic hazard has arisen that does not require a U-turn after passing its branching site is designated last detour route R2, and the branching site for branching from initial optimum route R0 to last detour route R2 is designated last branching site B2.

It is possible to select the route that detours at optimum branching site B1 far away from site I where a traffic hazard has arisen on optimum detour route R1. In this case, if the traffic hazard on initial optimum route R0 is eliminated just after branching to detour route R1, the vehicle must wastefully follow detour route R1 longer than the required time as compared to initial optimum route R0.

On the other hand, when there is an expectation for elimination of the traffic hazard on initial optimum route R0 and a detour is made to last detour route R2 from last branching site B2 nearest site I where a traffic hazard has arisen, if the traffic hazard is not eliminated, the vehicle has to follow last detour route R2. As a result, although optimum detour route R1 with a shorter required time could have been selected, the vehicle still must follow last detour route R2 with a longer required time.

Here, as one embodiment, the following selection method is adopted to select one route from optimum detour route R1 and last detour route R2. First, the difference in the required time from current site P to destination D between optimum detour route R1 and last detour route R2, that is, the value obtained by subtracting required time T1 of optimum detour route R1 from required time T2 of last detour route R2, is designated $\Delta T$. Also, the difference in distance between optimum branching site B1 from initial optimum route R0 to optimum detour route R1 and last branching site B2 from the initial optimum route R0 to last detour route R2, that is, the value obtained by subtracting distance L1 from current site P to optimum branching site B1 from distance L2 from current site P to last branching site B2, is designated $\Delta L$.

When the following relationship (I) is met, optimum detour route R1 is selected. If not, last detour route R2 is selected.

$$\Delta T > \min\{k \cdot \Delta L, Tk\} \qquad (1)$$

Figure 4:
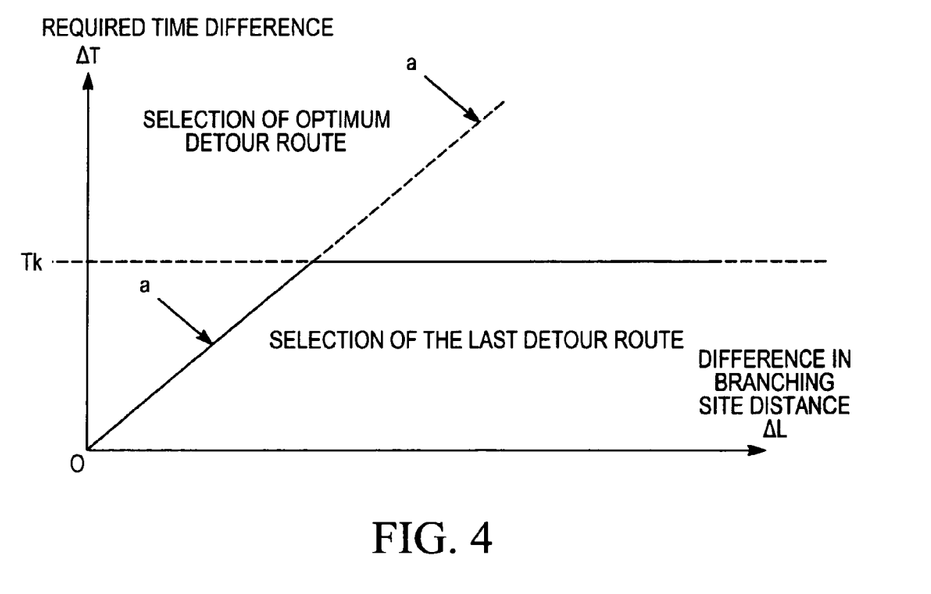
FIG. 4 is a graph of the difference in branching point, or site, distance plotted as a function of the required time difference according to the selection method of the detour route.

Relationship (1) is shown in FIG. 4. In relationship (1), k represents the slope of straight line a; Tk is a threshold of the required time; and min $\{k \cdot \Delta L, Tk\}$ is a function that selects the smaller of the variable $k \cdot \Delta L$ and the threshold Tk.

As can be seen from relationship (1) and the relationship shown in FIG. 4, basically, the larger the branching site distance difference $\Delta L$, the higher the possibility of elimination of the traffic hazard on optimum route R0 before the vehicle reaches last branching site B2, and last detour route R2 is selected. On the other hand, the larger the required time difference $\Delta T$, the higher the possibility that the traffic hazard on optimum route R0 will not be eliminated even when last branching site B2 is reached. In consideration of the risk of using last detour route R2 with a longer required time, it is considered to be more beneficial that optimum detour route R1 with the required time shorter than that of last detour route R2 be selected initially, and optimum detour route R1 is selected. Also, when required time difference $\Delta T$ is so large that it is over threshold Tk, optimum detour route R1 is selected despite the length of branching point distance difference $\Delta L$.

One may adjust slope a and threshold Tk in relationship (1) and FIG. 4 according to the rate of change of the traffic hazard as the cause of the detour, the preference of the user and the tolerance of the user for the risk.

Figure 5:
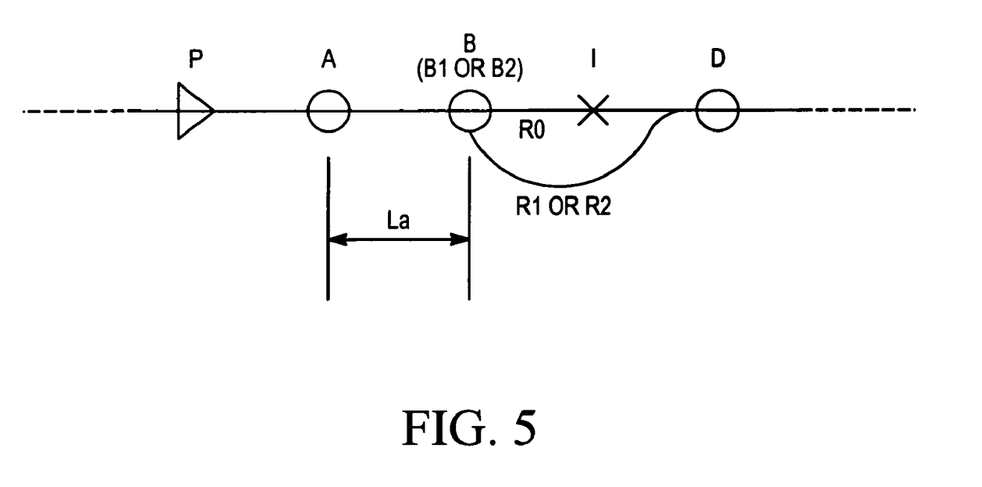
FIG. 5 is a diagram illustrating the computing method for the detour route guiding site.

Returning to FIG. 2, in step S7 after selection of the detour route, the detour route guiding site is computed. In this embodiment, as shown in FIG. 5, detour guiding is performed at site A at distance La from branching site B (optimum branching site B1 or last branching site B2) of the selected detour route (optimum detour route R1 or last detour route R2).

Distance La from branching site B to guiding site A is computed from detour preparation time Ta and current vehicle speed V using formula (2).

$$La = Ta \cdot V \qquad (2)$$

The optimum value is set for detour preparation time Ta, which includes the time for understanding the detour route guide, the time for judgment on whether the vehicle is to enter the detour route, the time of operation manipulation needed for changing lanes, etc. One may also change detour preparation time Ta corresponding to the traffic jam or other traffic state, the road type and other factors of the operating environment. On the other hand, in vehicle speed V the current vehicle speed, the newest average vehicle speed in a prescribed distance interval, the speed limit up to branching site B, etc., are set.

In step S8, judgment is made on whether detour guiding site A has been reached. If detour guiding site A has been reached, the process goes to step S9. In step S9, the optimum route is searched again. That is, based on the newest road traffic information received by beacon receiver 5 and/or FM multiplex receiver 5, the route with the shortest time from the current site to the destination is searched.

In step S10, as a result of re-search of the route, it is judged whether the traffic hazard on optimum route R0 has been eliminated, and initial optimum route R0 is searched again. When initial optimum route R0 is re-searched, detour guiding is stopped, and route guiding along initial optimum route R0 is continued. Then, the process returns to step S4, and the aforementioned process is repeated.

If, as a result of re-search of the route in step S9, the traffic hazard on initial optimum route R0 has not been eliminated, and a detour route is to be searched, the process goes to step S11. In step S11, judgment is made on whether a new detour route entirely different from optimum detour route R1 or last detour route R2 is searched. If a new detour route is to be searched, the process returns to step S7, and the aforementioned process is repeated. On the other hand, when previously searched optimum detour route R1 or last detour route R2 is re-searched, the process goes to step S12, and detour route guiding to optimum detour route R1 or last detour route R2 is announced.

In this way, as one embodiment, when the destination is set, the current site is detected. The optimum route from the current site to the destination is searched, and guiding is performed along the optimum route to the destination. Traffic information is acquired, and a traffic hazard that requires a detour from the optimum route undergoes detection. If a traffic hazard that requires a detour from the optimum route is detected, the traffic hazard is detoured, and a detour route to the destination is searched. Guiding is performed concerning the detour route at a site located a prescribed distance from the branching site where branching is to be made from the optimum route. Consequently, the persons in the vehicle can appropriately judge whether the vehicle should enter the detour route. That is, it is possible to perform guiding of the detour route at the optimum site. Consequently, it is possible to avoid the following problems of the prior art: wasteful detouring on the detour route while the traffic hazard has been eliminated, and the initial optimum route is available, or passing of the branching site to the detour route so that the vehicle has to execute a U-turn to go to the detour route.

In another embodiment, based on the detour preparation time for branching to the detour route and the vehicle speed, the distance from the branching site for the detour route to the route guiding site is determined. Consequently, it is possible to set the optimum detour route guiding site, so that the persons in the vehicle can appropriately judge whether the vehicle should enter the detour route.

In another embodiment, the optimum route to the destination is re-searched at a site located a prescribed distance from the branching site where branching is to be made from said optimum route. Only when the detour route for detouring to the optimum route is searched is guiding performed for the detour route. Consequently, it is possible to check whether the traffic hazard on the optimum route has been eliminated just before reaching the branching site to the detour route so that it is possible to follow the optimum route, and it is possible to avoid wasteful following of the detour route.

In another embodiment, based on the distance (branching site distance) between the branching site to the optimum detour route on the optimum route and the branching site to the last detour route and the difference between the required running time from the current site via the optimum detour route to the destination and the required running time from the current site via the last detour route to the destination (required time difference), either the optimum detour route or the last detour route is selected. Consequently, it is possible to avoid the problem of passing the branching site to the last detour route such that the vehicle must execute a U-turn on the optimum route, while it is possible to increase the probability of running on the initial optimum route after the traffic hazard has been eliminated.

In another embodiment, on a plane with the branching site distance and the required time difference taken as the two dimensions, a detour route selecting map is set so that for a large branching site distance, the last detour route is selected, and, for a large required time difference, the optimum detour route is selected. According to the detour route selection map, the optimum detour route or the last detour route is selected. Consequently, it is possible to avoid the problem of passing the branching site to the last detour route such that the vehicle must execute a U-turn on the optimum route, while it is possible to increase the probability of running on the initial optimum route after the traffic hazard has been eliminated.

In another embodiment, when the required time difference exceeds a preset threshold, even when the branching site distance is large, the optimum detour route is still selected. Consequently, it is possible to avoid the problem of passing the branching site to the last detour route so that the vehicle must execute a U-turn on the optimum route, while it is possible to increase the probability of running on the initial optimum route after the traffic hazard has been eliminated.

According to the example herein, the distance from the branching point for the detour route to the location for providing the detour route guidance is determined based on the speed of the vehicle and the preparation time for branching to the detour route. Thus, the optimal location for providing the detour route guidance can be established, and the driver can be prompted to appropriately judge whether to advance to the detour route.

Also, according to the example herein, the optimal route to the destination is retrieved at a location that is a predetermined distance from the point for branching to the detour route from the optimal route, and provides a guide regarding the detour route only when a detour from the optimal route has been retrieved. Thus, the probability of being able to enter the optimal detour route can be enhanced.

Further according to the example herein, either the optimal detour route or the last detour route is selected based on the distance between the branching point to the optimal detour route from the optimal route and the branching point to the last detour route (branching point distance), and the difference between the travel time necessary to reach the destination from the present location via the optimal detour route and the travel time necessary to reach the destination via the last detour route from the present location (required time difference). Thus, the probability of being able to enter the optimal detour route can be enhanced.

In another benefit to the example herein, a detour route selection map that selects the last detour route when the branching point distance is great, and that selects the optimal detour route when the required time is great, is provided on a two dimensional plane comprised of the branching point distance and the necessary time difference, and either the optimal detour route or the last detour route is selected according to this detour route selection map. Thus, the probability of being able to enter the optimal detour route can be enhanced.

Also according to the example herein, the optimal detour route is selected even if the branching point distance is great when the required time difference exceeds the preset threshold value. Thus, the probability of being able to enter the optimal detour route can be enhanced.

Figure 6:
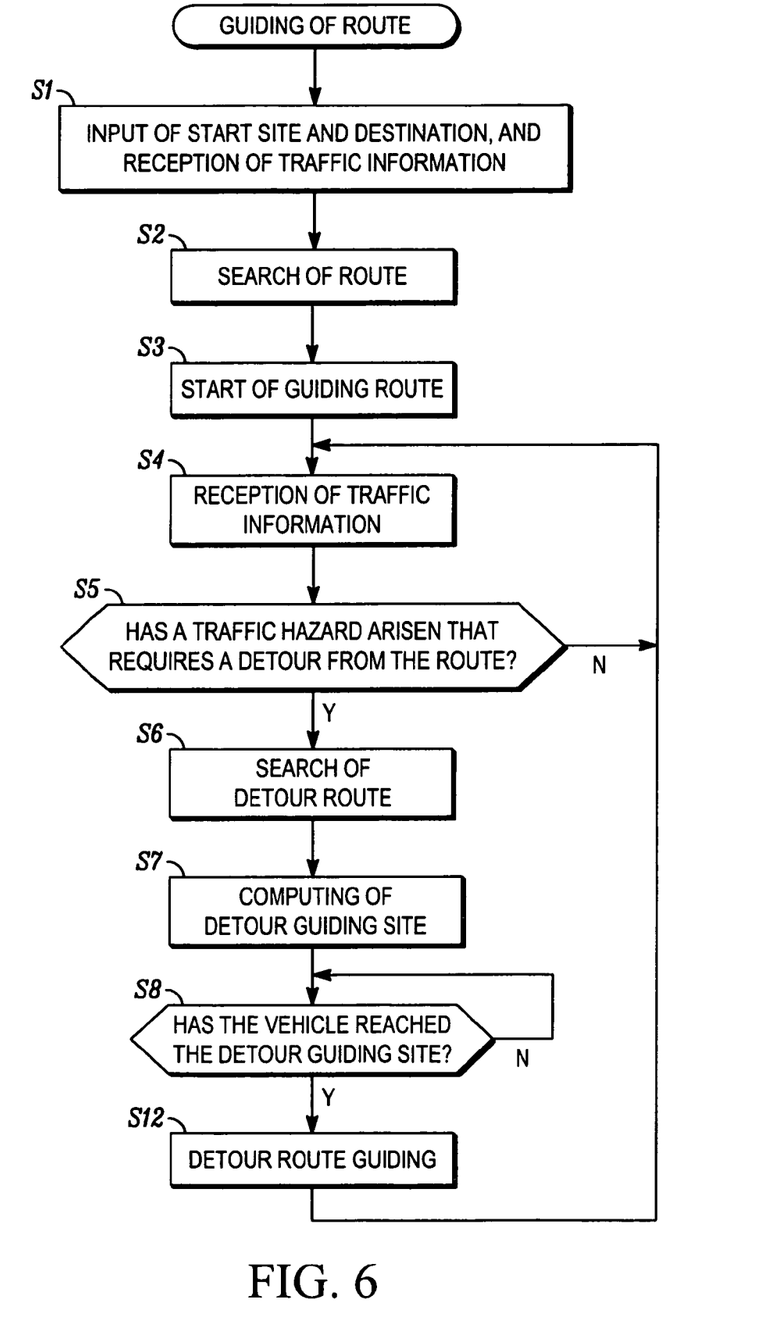
FIG. 6 is a flow chart showing the route guiding program in a second embodiment.

In the previous example, the optimal route was retrieved again after reaching detour route guiding site, or location, A, and either the optimal route or a detour route was re-selected based on the retrieval result. However, it is possible to announce the detour route guidance without again retrieving the optimal route if detour guiding site A is reached. FIG. 6 shows a flow chart of the route guidance program in this modified example. The steps that perform the same processes as in the flow chart shown in FIG. 2 are given the same step numbers, and explanations of FIG. 6 will focus on areas of difference with FIG. 2.

In step S1, the starting location, destination and the route are input from input device 7, and road traffic information is transmitted from beacon receiver 5 and/or FM multiplex receiver 6. In step S2, the optimal route to the destination is retrieved by carrying out a calculation for the shortest cost in time, taking into consideration the road traffic information, according to the Dykstra method, or the optimal route to the destination is retrieved by carrying out a calculation for the shortest distance, as described above. In step S3, a road map of the present location and the optimal route from the current location of the vehicle to the destination are displayed on display 9, and road guidance begins.

In step S4, road traffic information is received by beacon receiver 5 and/or FM multiplex receiver 6. In the subsequent step S5, the road traffic information is analyzed, and a check is performed for development of traffic problems, such as restricted roads and traffic jams, along the optimal route to the destination, i.e., traffic problems that require a detour from the initial optimal route. If a traffic jam that needs to be detoured around has not developed on the optimal route, process flow returns to step S4 in which traffic information is received so that checks can again be performed for development of traffic problems and so that road guidance along the optimal route to the destination can continue. On the other hand, if a traffic problem develops on the optimum route that needs to be detoured around, process flow proceeds to step S6. In step S6, a calculation for the shortest time or the shortest distance is performed according to the Dykstra method, and a detour route to the destination is retrieved that goes around the location with the traffic problem.

The method for retrieving the detour route is the same as the retrieval method in the previous example. As shown in FIG. 3, the optimum detour route R1 requiring the shortest time or shortest distance for branching at the optimum branching point B1 and last detour route R2 for branching from the last branching point B2 are extracted from the plurality of detour route candidates for reaching destination D while avoiding traffic problem location I. Then, as described above, one of the detour routes is selected according to equation (1) based on the difference $\Delta T$ between the time required T1 for optimum detour route R1 and the time required T2 for the last detour route R2 and the distance $\Delta L$ from optimum branching point B1 to last branching point B2.

Returning now to FIG. 6, the detour route guidance location, detour guiding site A, is calculated in step S7 after selecting the detour route. As was explained with reference to FIG. 5, distance La from branching point B back to guiding site A is obtained according to equation (2) based on detour preparation time Ta and vehicle speed V. Detour route guidance is provided at site A that is distance La from branching point B (optimum branching point B1 or last branching point B2) for the selected detour route (optimum detour route R1 or last detour route R2). In step S8, whether the detour guiding site A has been reached is checked, and if detour guiding site A has been reached, process flow proceeds to step S12, and the detour route guidance to the optimum detour route R1 or the last detour route R2 is revealed.

As described above, according to the modification of the application example, when providing guidance to the destination along the optimum route by setting the destination, detecting the present location, and retrieving the optimum route from the present location to the destination, a traffic problem on the optimum route that needs to be avoided is detected by obtaining the traffic information. The detour route requiring the shortest travel time to reach the destination by detouring around the traffic problem is retrieved when a problem requiring a detour is detected, and guidance related to the detour route is provided at a location that is an optimal distance from the point for branching from the optimum route to the detour route. This makes it possible to prompt the driver to judge whether to advance to the detour route. Specifically, detour route guidance can be provided at the optimum location, making it is possible to avoid missing the optimum detour route as was the case in the prior art.

Also according to this modified example, when providing guidance to the destination along the optimum route by setting the destination, detecting the present location, and retrieving the optimum route to the destination from the present location, a traffic problem on the optimum route that needs to be detoured around is detected by obtaining the traffic information. The detour route that requires the shortest distance to reach the destination by detouring around the traffic problem is retrieved when a traffic problem that needs to be avoided is detected on the optimum route, and guidance related to the detour route is provided at a location that is an optimal distance from the point for branching from the optimum route to the detour route. This makes it possible to prompt the driver to judge whether to advance to the detour route. As described, detour route guidance can be provided at the optimum location, making it is possible to avoid missing the optimal detour route as was the case in the prior art.

In the aforementioned embodiment, the search for the optimum route to the destination, the optimum detour route and the last detour route are executed in the vehicle. However, one may also adopt a scheme whereby the signals concerning the current site of the vehicle and the destination are sent to an information center, and routes are searched in the information center. At the same time, the optimum detour route or the last detour route is selected at the information center, and the signal of the route of the search result is sent to the vehicle.

This application is based on Japanese Patent Application Nos. 2005-097317, filed Mar. 30, 2005 and Japanese Patent Application No. 2005-327042, filed Nov. 11, 2005, in the Japanese Patent Office, the entire contents of which are hereby incorporated by reference.

The above-described embodiments have been described in order to allow easy understanding of the present invention, and do not limit the present invention. On the contrary, the invention is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for navigating a vehicle, comprising:
an input device operable to set a destination;

a location detector operable to detect a current location of the vehicle;

at least one receiver operable to acquire traffic information, including an existence of a traffic obstacle on an optimum route from the current location to the destination; and a controller operable to search for the optimum route from the current location to the destination and a detour having at least one of the shortest time to the destination and the shortest distance to the destination in order to detour around the traffic obstacle when the existence of the traffic obstacle is detected; and the controller operable to perform guidance related to the detour a prescribed distance before a branching point that branches from the optimum route to the detour, wherein the detour having the shortest time to the destination is an optimum detour route: and wherein the controller is further operable to search among a plurality of detours for detouring around the traffic obstacle for a last detour route to the destination branching from a branching site on the optimum route nearest the traffic obstacle, the controller further operable to select one of the optimum detour route and the last detour route based on a branching site distance between the branching point for the optimum detour route on the optimum route and the branching point for the last detour route and a required time difference between a required running time from the current location via the optimum detour route to the destination and a required running time from the current location via the last detour route to the destination.

2. The apparatus according to claim 1 wherein the controller is further operable to create a linear relationship between the branching site distance and the required time difference whereby the slope is designated as k; and is further operable to select the optimum detour route when the time difference is greater than one of the branching point distance multiplied by k and a preset time difference threshold.

3. An apparatus for navigating a vehicle, comprising:
destination setting means for setting a destination;
current location detection means for detecting a current Location of the vehicle;
traffic information acquisition means for acquiring traffic information;
route search means for searching for an optimum route from the current location to the destination;
detour search means for searching for a detour having at least one of a shortest time and a shortest distance to the destination to detour around a traffic obstacle when the traffic obstacle is detected on the optimum route by the traffic information acquisition means; and
detour guidance means for performing guidance at a prescribed distance before a branching point that branches from the optimum route to the detour, wherein the prescribed distance is based on a preparation time for branching to the detour and the vehicle speed.

4. The apparatus according to claim 3 wherein the detour guidance means further comprises re-searching means for searching the optimum route to the destination at the prescribed distance; and wherein the detour guidance means further comprises means for directing the vehicle along the detour at the branching point when the traffic obstacle still exists.

5. The apparatus according to claim 3 wherein the detour with the shortest time to the destination is an optimum detour route; and wherein the detour search means further comprises means for searching for a last detour route that branches nearest the traffic obstacle from among a plurality of detour routes for detouring the traffic obstacle on the optimum route.

6. The apparatus according to claim 3 wherein the detour with the shortest time to the destination is an optimum detour route; and wherein the detour search means further comprises means for searching for a last detour route that branches nearest the traffic obstacle, the apparatus further comprising:
means for selecting one of the optimum detour route and the last detour route based on a branching point distance between a first branching point for the optimum detour route on the optimum route and a second branching point for the last detour route and the time difference between a running time from the current location to the destination via the optimum detour route and a running time from the current location to the destination via the last detour route.

7. The apparatus according to claim 6, further comprising:
the branching point distance and the time difference reflected in two dimensions on a plane; and
a detour route selecting map wherein the last detour route has a largest branching point distance and the optimum detour route has a largest time difference; and wherein the route search means is operable to select one of the optimum detour route and the last detour route according to the detour route selecting map.

8. The apparatus according to claim 7 wherein the route search means is operable to select the optimum detour route when the time difference is longer than a preset threshold, even when the branching point distance is large.

9. A method for navigating a vehicle, comprising:
setting a destination;
detecting a current location of the vehicle;
acquiring traffic information;
searching for an optimum route from the current location to the destination;
searching for a detour having at least one of a shortest time and a shortest distance to the destination to detour around a traffic obstacle when the traffic obstacle is detected based on the acquired traffic information;
performing guidance at a prescribed distance before a branching point that branches from the optimum route to the detour; and
determining the prescribed distance based on a preparation time for branching to the detour and the vehicle speed at the branching point.

10. The method according to claim 9, further comprising:
searching for a last detour route, wherein the last detour route branches from the optimum route at a point nearest the existence of the traffic obstacle; and
selecting one of the detour route and the last detour route for the vehicle to follow when performing guidance at the prescribed distance.

11. The method according to claim 9, further comprising:
designating the detour having the shortest time as the optimum detour route;
searching for a last detour route, wherein the last detour route branches from the optimum route at a point nearest the existence of the traffic obstacle; and
selecting one of the optimum detour route and the last detour route for the vehicle to follow based on a branching point distance between the branching point for the optimum detour route and the branching point for the last detour route and a time difference between an expected running time from the current location to the destination via the optimum detour route and an expected running time from the current location to the destination via the last detour route.

12. The method according to claim 11, further comprising:
selecting the optimum detour route for the vehicle to follow even when the branching point distance is large when the time difference is longer than a preset threshold.

13. The method according to claim 11, further comprising:
creating a linear relationship between the branching point distance and the required time difference whereby the slope is designated as k; and selecting the optimum detour route for the vehicle to follow when the time difference is greater than one of the branching point distance multiplied by k and a preset time difference threshold.

14. The method according to claim 9 wherein performing guidance at the prescribed distance further comprises detecting a continued existence of the traffic obstacle on the optimum route based on the acquired traffic information.

15. The method according to claim 14, further comprising:
following the optimum route when detecting the continued existence of the traffic obstacle indicates that the traffic obstacle has cleared.

16. The method according to claim 15, further comprising:
re-searching for a detour having at least one of a shortest time and a shortest distance to the destination to detour around the traffic obstacle when detecting the continued existence of the traffic obstacle indicates one of the traffic obstacle has not cleared and a new traffic obstacle has arisen.

* * * * *